United States Patent [19]
Martin

[11] 3,873,843

[45] Mar. 25, 1975

[54] DOCUMENT DETECTION APPARATUS

[75] Inventor: Clifford E. Martin, Lansdale, Pa.

[73] Assignee: Mohawk Data Sciences Corporation, Herkimer, N.Y.

[22] Filed: Nov. 29, 1973

[21] Appl. No.: 420,127

[52] U.S. Cl. .................. 250/561, 250/206, 250/222, 307/221, 328/146

[51] Int. Cl. .................. G01b 7/06

[58] Field of Search ........... 250/222, 206, 214, 209, 250/559, 561, 571, 569; 340/414, 415, 259; 328/146, 148; 307/221

[56] References Cited

UNITED STATES PATENTS

| | | | |
|---|---|---|---|
| 3,321,637 | 5/1967 | Beltz et al. | 250/557 |
| 3,614,419 | 10/1971 | Daughton et al. | 250/222 X |
| 3,628,031 | 12/1971 | Azore, Jr. | 250/569 |
| 3,665,326 | 5/1972 | Sullivan | 328/146 X |
| 3,734,631 | 5/1973 | Justice et al. | 356/205 |

*Primary Examiner*—Walter Stolwein
*Attorney, Agent, or Firm*—Robert R. Hubbard

[57] ABSTRACT

Document detection apparatus especially adapted for the detection of double document conditions occurring in character recognition apparatus. The object detection apparatus includes a light source and a light detector positioned on opposite sides of the document feed path. The detector output signal amplitude is a function of the opacity of the document being passed between the light source and detector. When a doubles condition (two or more documents) exists, the detector output signal amplitude changes considerably more than for a single document so as to cause an alarm signal to be generated. An automatic opacity measuring and adjusting network is also provided to be responsive to the feed of a first document so as to set the detector output signal to a level corresponding to the capacity of thickness of such first document.

4 Claims, 1 Drawing Figure

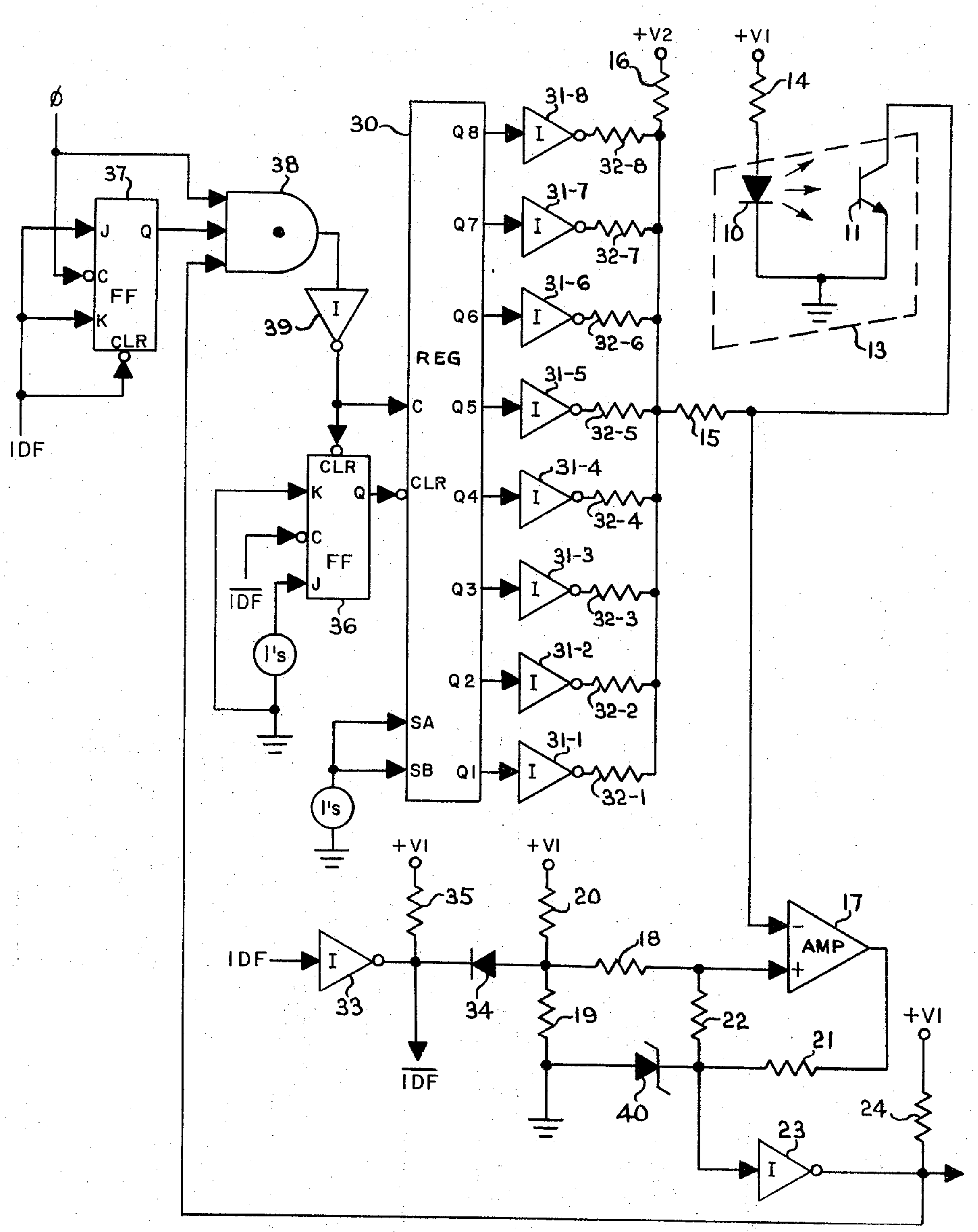
ø
37
J
Q
C
FF
K
CLR
IDF
38
39
I
30
REG
C
CLR
Q8
Q7
Q6
Q5
Q4
Q3
Q2
Q1
SA
SB
36
1's
IDF
31-8
31-7
31-6
31-5
31-4
31-3
31-2
31-1
32-8
32-7
32-6
32-5
32-4
32-3
32-2
32-1
+V2
16
+V1
14
10
11
13
15
17
AMP
+V1
35
20
18
19
22
21
33
34
40
23
24
IDF

DOCUMENT DETECTION APPARATUS

BACKGROUND OF THE INVENTION

1. Field of the Invention

This invention relates to document detection apparatus and in particular to apparatus which is especially adapted to detect a double sheet or an excessively thick sheet condition in a document transport system. In document transports for character recognition devices, such as optical character readers, magnetic ink character readers, perforated character readers and the like, it is desired to recognize or read the characters from one document at a time. Inevitably, situations occur where the document transport feeds two or more documents to the read station at the same time. It is a situation of this type that the detector apparatuus of the present invention is employed to detect.

2. Prior Art

Doubles detectors have been employed in the prior art. In one type of prior art doubles detector, exemplified by U.S. Pat. No. 3,679,202, a pair of rollers are spaced apart a distance X+C, where X is the desired document thickness and C is a tolerance factor. When a document of thickness greater than X+C passes through the rollers, a microswitch is tripped so as to producue an alarm signal which may be used to turn the character recognition apparatus off. The X+C spacing is set manually by inserting a document of thickness X in a feeler mechanism which is mechanically linked to one of the rollers.

In another prior art doubles detector, exemplified by U.S. Pat. No. 3,278,754, a light source directs light onto the document. An associated light responsive device responds to reflected light to produce an output signal, the amplitude of which is proportional to reflected light intensity and, hence, distance away from the document. An air flow is established on either side of the document so as to cause double documents to separate by forming an air pressure differential between the outer faces and the common face of the documents. This causes the documents to separate and come closer to the light source and light detector. The intensity of the reflected light increases, causing the light detector output signal amplitude to increase above a preset threshold level. When this happens an alarm signal is generated.

Neither of these prior art solutions is satisfactory. In the aforementioned mechanical arrangement it is difficult to set the device for thin documents (on the order of 10 mils and less). Also, the detector must be manually set each time the document thickness changes. The aforementioned optical detector requires an additional part, namely, a vacumm pump or air source, which is both costly and noisy. In addition, the optical detector threshold must be set manually.

BRIEF SUMMARY OF THE INVENTION

An object of the present invention is to provide novel and improved document detection apparatus.

Another object is to provide novel and improved apparatuus for detecting a double document sheet condition.

Still another object is to provide a doubles detector which automatically adjusts its document thickness threshold.

Yet another object is to provide a novel and improved document thickness detector apparatus which has no moving parts other than the usual document feed mechanism.

A further object is to provid a novel and improved document thickness detector which employs optical techniques.

In brief, document detection apparatus embodying the invention includes a light source and a light detector positioned on opposite sides of a document feed path. With no document present in the space between the light source and detector, the detector output current is maximum. When a single document is fed between them, the detector current decreases as the opacity of the document atenuates the intensity of the light which is transmitted or passed by the document. This decrease in signal current for a single document is allowable and nothing happens. However, when two or more documents are fed to the thickness detection station, the light intensity is further atenuated with a concomitant decrease in detector signal current. This further decrease in signal current causes the detector output voltage to rise above a threshold level so as to generate an alarm signal.

In accordance with another aspect of the invenyion, there is additionally provided means for automatically providing an adjustment of the opacity or thickness sensitivity in response to each group of documents to be processed. This automatic feature includes means responsive to the feed of the first document of each group to adjust the output signal current of the light detector to a level corresponding to the document opacity or thickness. Any single one of the subsequently fed documents in the group produces this same signal level. However, a doubles condition will cause the signal current to fall below this preset level so that an alarm signal is generated.

BRIEF DESCRIPTION OF THE DRAWINGS

In the accompanying drawing the sole FIGURE is a schematic circuit diagram, in part, and a block diagram, in part, of document detection apparatus embodying the present invention.

DESCRIPTION OF PREFERRED EMBODIMENT

With reference now to the sole FIGURE of the drawing, document detection apparatus embodying the invention includes a light source 10 and a light detector 11 positioned on opposite sides of a document feed path simulated by the dashed line document 13. The document transport or feed mechanism and associated character read apparatus are not shown as they are not relevant to an understanding of the document detector of this invention. Suffice it to say here that the detection station is located along the document feed path prior to the recognition or read station in a character recognition apparatus.

As illustrated, the light source 10 preferably takes the form of a light emitting diode (LED) connected in series with a resistor 14, circuit ground and a d.c. voltage +V1, having its negative lead returned to ground. The light detector 11 takes the form of a phototransistor having its emitter connected to ground and its collector connected in series with resistors 15 and 16 and another d.c. voltage +V2, having its negative lead returned to ground.

The collector of the phototransistor 11 is also connected to the negative (inverting) input of an operational amplifier 17. The amplifier 17 functions to compare the signal at the collector of the phototransistor with a fixed reference voltage and to produce an alarm signal whenever the signal voltage amplitude exceeds this reference voltage. To this end, amplifier 17 has its positive (non-inverting) input coupled via resistor 18 to a voltage divider comprised of resistors 19 and 20 connected in series with the +V1 voltage source and ground. The output of amplifier 17 is coupled via resistor 21 to an inverter 23 and a feedback resistor 22. The other end of the feedback resistor 22 is connected to the non-inverting input of amplifier 17. The alarm signal is taken from the output of inverter 23. Inverter 23 is of the open collector type, meaning it consists of a transistor having an unconnected collector. For this reason the inverter output (also the transistor collector lead) is shown as coupled via a collector resistor 24 to the source +V1.

In operation the LED 10 emits radiant energy in both the visible and infrared regions of the spectrum. The amount or intensity of the emitted radiation which is actually incident upon the phototransistor is a function of the opacity of the document 13. By opacity is meant the ability of the document to pass the emitted radiation. The opacity of a single document causes the radiation to be attenuated a certain amount. Two or more documents increase the total opacity, and, hence, serve to attenuate the radiation an even greater amount. Also, documents of different stock or material will attenuate the emitted radiation by different amounts as their opacities differ.

The phototransistor circuit is arranged so that it responds to the change in intensity of the incident radiation caused by an increase in opacity beyond that of a single document which is to be processed. Thus, when no document is present, the intensity of the radiation incident upon the phototransistor is maximum. This causes the phototransistor to conduct maximum current so that its output voltage has a relatively low value (lower than the voltage present at the non-inverting input of amplifier 17). Accordingly, the amplifier output voltage is a positive value which causes the output voltage of inverter 23 to be near 0 volt or a logical 0. When a document 13 is passed between the LED and phototransistor, the intensity of the radiation incident upon the phototransistor decreases. This causes the phototransistor current to decrease so that its output voltage at the inverting input of amplifier rises. However, this increased voltage value is still below the value of the voltage at the non-inverting input of amplifier 17. The amplifier output voltage, thus, does not change.

When two or more documents are present (doubles condition), the intensity of the radiation incident upon the phototransistor decreases considerably more than for the single document situation due to their greater total opacity. The phototransistor current now decreases so much that the voltage at the inverting input of amplifier 17 becomes larger than the voltage at the non-inverting input. As a result, the amplifier output voltage now drops to about 0 volt which is inverted by inverter 23 to a positive voltage or a logical 1, which is indicate of an alarm condition. This alarm signal output of inverter 23 may be employed by other circuits (not shown) in the character recognition apparatus for turning the document feed mechanism off or rendering the document read station inoperative.

The doubles document detector described thus far is suitable for use in applicactions where it is desired to read only documents of the same opacity or thickness. For such applications the phototransistor collector resistors 15 and 16 and the associated collector voltage +V2 are chosen relative to the reference voltage circuit so as to produce the aforementioned operation taking into account the opacity of the desired document. However, there are many applications where documents having different opacities and/or thicknesses are to be used in a character recognition apparatus. This situation prevails in optical character recognition apparatus and may also occur in other types of recognition devices.

Accordingly, another aspect of the present invention is to provide means for automatically adjusting the opacity or thickness sensitivity of the doubles detector for each group of documents to be processed by the character recognition device. This is accomplished by adjusting the phototransistor collector current to a predetermined level during the feed of the first document of a document group to be processed. Briefly, the opacity of the first document is measured during the first document feed and is employed to alter the collector reistance of the phototransistor to a level which corresponds to the measured opacity. This is accomplished automatically in either of two ways. One way is to allow the measuring and adjusting circuitry to operate in response to a feed command derived from an operator-actuated document feed switch at the operator console of the character recognition device. The other way is to derive the feed command from a program which controls the character recognition device. For the purpose of the present description, it is assumed that the character recognition device includes a document feed switch.

The opacity measuring and sensitivity adjusting means includes a shift register 30 which produces an output value indicative of the first document opacity. This output value is taken from the register outputs Q1 to Q8 and is used to control the connection of the collector resistors 32-1 through 32-8 of associated open collector inverters 31-1 through 31-8 in a shunt circuit relation with collector resistor 15. It should be noted that all of the inverters 31-1 through 31-8 as well as the operational amplifier 17 include connections to circuit ground. These connections have been omitted from the drawing in order to avoid clutter thereof. The shunt current path provided by any one of the inverters which is activated by an associated register output is by way of its associated collector resistor 32-1 through 32-8, as the case may be, through the collector-to-emitter path of the transistor contained therein to circuit ground.

When the character recognition device operator actuates the document feed switch (not shown), a first document feed (1DF) signal is produced. This 1DF signal is employed to condition the register 30 and the reference voltage circuit for amplifier 17 so as to commence the opacity measuring and adjusting operation for the first document being fed to the doubles detector station. To this end, the 1DF signal, which for the illustrated design is a positive voltage level or logical 1, is applied to an inverter 33. this causes the output of the inverter 33 ($\overline{1DF}$) to become substantially 0 volt or a logical 0. This causes a diode 34 to become forward biased so as to clamp the common junction of resistors 18 and 19 and, hence, the non-inverting input of amplifer 17 to about 0.7 volt (voltage drop across the diode 34). Resistor 35 merely serves as a collector resistor for the inverter 33 which for the illustrated design is an open collector type device.

The $\overline{1DF}$ signal is further employed to clear the register 30 to an all O's condition. This is accomplished by means of a J-K flip-flop 36 which has its J and K inputs connected to permanent sources of logical 1 to 0. The 0 source is simulated by the connection to circuit ground. The logical 1 source may simply be a connection to the +V1 voltage source.

As will be developed shortly, prior to the 1 to 0 transition of the $\overline{1DF}$ signal flip-flop 36 is in a reset condition whereby its $\overline{Q}$ output is a 1. This $\overline{Q}$ output is coupled to the clear (CLR) input of register 30. The small circle or bubble at this input indicates that the input is activated by a false or 0 signal rather than a true or 1 signal. Accordingly, the 1 to 0 transition of the $\overline{1DF}$ signal causes the flip-flop 36 to toggle so that its $\overline{Q}$ output becomes a 0 to thereby clear the register 30.

Simultaneous with the setting of the amplifier 17 reference voltage to 0 volt and the clearing the register 30, the 1DF signal also conditions a J-K flop 37 to pass clock pulses $\phi$ to an AND gate 38. The clock signals $\phi$ may be derived from any suitable clock signal source (not shown) and have a rather high pulse repetition rate. For example, in one exemplary optical character recognition device the clock pulses occur every 32 microseconds for a document speed of 50 inches per second.

The J-K flip-flop 37 has its J and K inputs and its clear input CLR connected to receive the 1DF signal. Prior to the operator actuation of the first document feed switch, the 1DF signal is a 0 which places the flip-flop 37 in a cleared condition (Q output is a 0) and disables the flip-flop 37 from responding to the clock signal $\phi$. Upon actuation of the first document feed switch, the 0 to 1 transition of the 1DF signal conditions the flip-flop 37 to toggle or switch back and forth in response to subsequently occurring pulses applied to its clock input C. So long as the 1DF signal is a 1, the flip-flop 37 acts to divide the frequency of the clock signal $\phi$ by 2. Accordingly, AND gate 38 which receives both the clock signal $\phi$ and the Q output of flip-flop 37 then acts (when enabled) to pass only every other positive-going pulse of the clock signal $\phi$. The other input to AND gate 38 is the output of inverter 23 which is a 0 at this time so that AND gate 38 is disabled.

From the time the first document feed switch is actuated, it takes several milliseconds (50 to 70 milliseconds in one exemplary design) for the document to reach the doubles detection station. During this period of time the phototransistor 11 is flooded with maximum light intensity so that the inverting input to amplifier 17 is at substantially 0 volt which is substantially less than the 0.7 volts at the non-inverting input. Accordingly, the output of amplifier 17 is positive during this period of time. This causes the inverter 23 output to be a 0 which disables AND gate 38 from passing the clock pulses. When the document 13 is finally detected by the phototransistor 11, the inverting input to amplifier 17 becomes more positive than the 0.7 reference voltage level so that the output of amplifer 17 falls to about 0 volt. This causes the inverter 23 output to become a 1 which enables AND gate 38 to pass clock pulses via an inverter 39 to the shift input C of the register 30 and to the CLR input of flip-flop 36. Thus, the first clock pulse passed by AND gate 38 and inverter 39 acts on its leading edge to clear flip-flop 36 (switch its $\overline{Q}$ output to a 1) so as to lift the clear from register 30. The trailing edge of this first clock pulse then shifts a 1 into the first stage of register 30 as discussed below.

The register 30 is a serial input and parallel output device which has its serial input SA and SB coupled in common to receive all 1's as an input. Accordingly, at the time the first document is detected by the phototransistor 11 the register 30 begins to shift a serial pattern of all 1's through its stages. Thus, successive ones of the shift pulse causes the inverters 31-1 to 31-8 to sequentially connect the associated resistors 32-1 to 32-8 in shunt with the resister 15. The effect of each shunt resistor connection is to cause a step or incremental reduction in voltage levels at the junction of resistors 15 and 16 and at the inverting input of amplifier 17. The shift pulses continue to shift the all 1's bit pattern into the register 30 until enough of the resistors 32-1 to 32-8 have been connected in shunt to lower the inverting input voltage to voltage level to amplifier 17 to a level which is lower than the 0.7 volt reference level at the non-inverting input to the amplifier. This will cause the amplifier output to go positive which in turn causes the inverter 23 to apply a 0 to AND gate 38 so as to disable the further application of clock or shift pulses to the register 30.

The 1DF signal may now be terminated so as to restore the full reference voltage level to the non-inverting input of amplifier 17. When this happens, the flip-flop 37 is disabled and cleared to the condition where its Q output is a 0. The bit pattern shifted into register 30 is locked in so that is continually causes those ones of the resistors 32-1 to 32-8 which were connected in shunt with resistor 15 during the first document feed operation to remain so connected for the feed of subsequent documents. As single ones of subsequently fed documents are detected by transistor 11, its collector voltage rises above 0 volt but does not exceed the reference voltage applied to the non-inverting input of amplifier 17. However, when two or more documents, increase the total opacity between the LED 10 and transistor 11, the collector voltage rises to a higher voltage than the reference voltage. This causes the output of amplifier 17 to fall to about 0 volt which in turn causes the inverter 23 output to become a 1 so as to signify a doubles conditions. The purpose of the Zener diode 40 is to limit the positive voltage at the input to inverter 23 to a voltage level which is compatible with inverter 23. For instance, diode 40 might have a 4.3 volts rating for inverters belonging to the transistor-transistor logic family.

The flip-flops, inverters, AND gate register 30 may be selected from "The Integrated Cicuits Catalog for Design Engineers." a catalog of Texas Instruments, Inc. For example, the open collector inverter devices 31-1 to 31-8 may be the 7,405 Models described in the aforementioned catalog. Although the inverters 23 and 33 are shown in the illustrated design as open collector devices, they could just as well take the form of a two-input NAND gate having both of its inputs tied together. The amplifier 17 may take the form of a Model 741 and the phototransistor 11 may be a FPT 100, both available from Fairchild Semiconductor Corporation. In an exemplary design employing the aforementioned components, and voltage values of 12 volts and 5 volts for the +V2 and +V1 voltage sources, the various resistors have the values given below:

| Resistors | Value (ohms) |
|---|---|
| 32-1 | 7,500 |
| 32-2 | 11,000 |
| 32-3 | 9,100 |
| 32-4 | 6,800 |
| 32-5 | 5,600 |
| 32-6 | 3,900 |
| 32-7 | 2,700 |
| 32-8 | 1,800 |
| 16 | 1,500 |
| 15 | 20,000 |
| 18 | 10,000 |
| 19 | 464 |
| 20 | 866 |
| 21 | 3,900 |
| 22 | 220,000 |
| 24, 35 | 1,000 |

What is claimed is:

1. In document detection apparatus in which a source of radiant energy and a radiant energy responsive detector are positioned on opposite sides of a document detection station, said apparatus including a circuit for producing an alarm signal whenever the detector output signal amplitude exceeds by a predetermined amount a threshold value corresponding to the opacity of a single document; the improvement which comprises:

means responsive to the feed of the first document of a group of documents to measure the opacity of such first document;

said detector being a phototransistor;

collector resistance means coupling the phototransistor collector to a bias voltage source.

a bank of resistors, and switching means responsive to the measured opacity to couple selected ones to said resistors in shunt with at least a portion of the collector resistance to adjust the phototransistor collector current to a senstivity level commensurate with the measured opacity.

2. Document detection apparatus as set forth in cliam 1 and further including:

means responsive to the feed of the first document to produce a first document feed signal;

wherein said measuring means includes:

means responsive to the first document feed signal (1) to lower the reference signal value and (2) to generate clock pulses in time sequence, means responsive to said clock pulses to operate the switching means to couple said resistors one at a time in shunt with the collector resistance until the collector voltage rises above the lowered reference value sufficiently to cause the comparator to produce a change in its output signal level, and means for coupling the comparator output signal to said clock pulse generating means to stop the generation of further clock pulses.

3. Document detection apparatus as set forth in claim 2 wherein said switch operating means is a shift register with an input circuit containing a predetermined bit pattern which is shifted into the register in response to said clock pulses.

4. Document detection apparatus as set forth in claim 3 wherein the shift register is cleared to the all 0's condition in response to the first document feed signal; and wherein the bit pattern is all 1's so that each clock pulse causes one of the resistors to be coupled in shunt with the collector resistance.

* * * * *